United States Patent Office 2,907,277
Patented Oct. 6, 1959

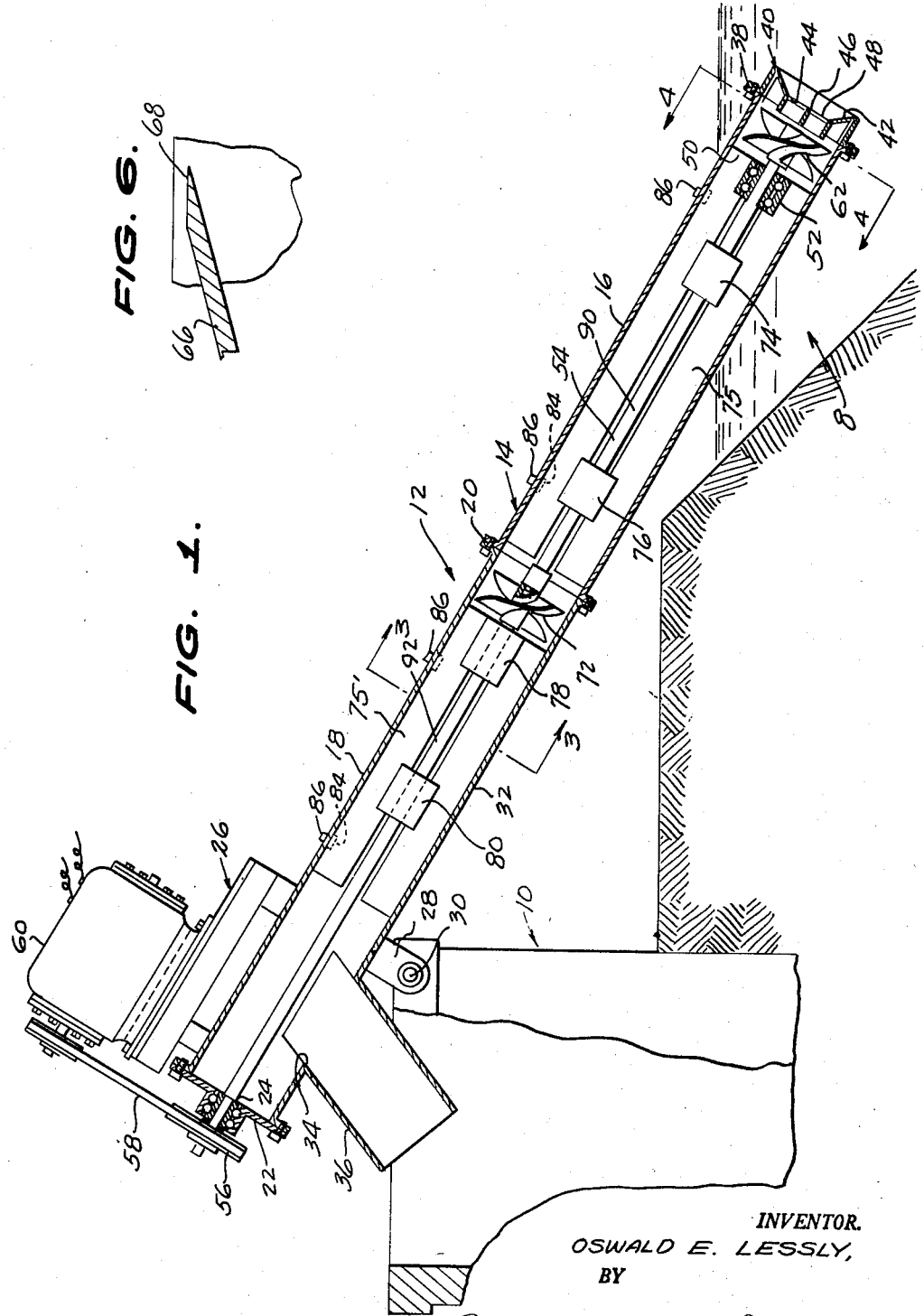
Oct. 6, 1959    O. E. LESSLY    2,907,277
SELF-CLEANING AUGER PUMP
Filed June 21, 1957    2 Sheets-Sheet 1
INVENTOR.
OSWALD E. LESSLY,
BY
McMorrow, Berman + Davidson
ATTORNEYS.

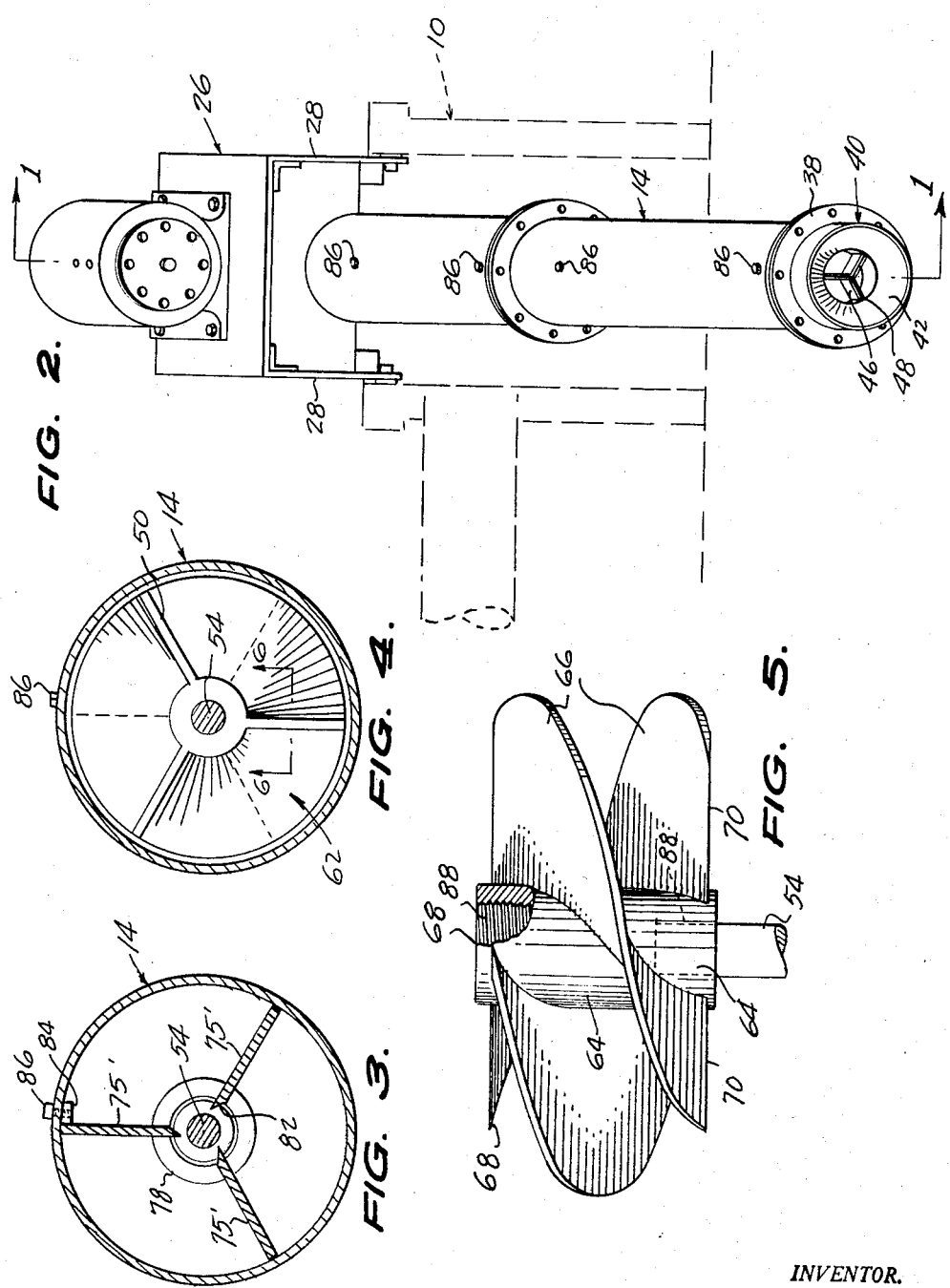

2,907,277

SELF-CLEANING AUGER PUMP

Oswald E. Lessly, Caldwell, Idaho

Application June 21, 1957, Serial No. 667,162

3 Claims. (Cl. 103—93)

This invention relates to an improved self-cleaning auger pump especially for use in elevating water, laden with moss and other debris, from irrigation ditches, sumps, and the like.

The primary object of the invention is to provide a generally superior device of this kind which is more efficient in operation and easier to install and use, requires less power for its operation, and is more easily maintained.

Another object of this invention is to provide a device of the kind indicated which has means for cutting up and reducing the size of masses or pieces of debris as the same enter the device and for moving the cut up material upwardly in the device, and for discharging the raised material, in a manner to assure free flow of pumped water through the device and to positively prevent clogging of the device with debris.

Another object of the invention is to provide a device of this kind which is made up of sections or units, each containing pump mechanism, which can be easily added or taken away, to provide a pump of desired length.

A further object of the invention is to provide a device of the kind indicated which is composed of a minimum number of simple parts, and which can be made in rugged and serviceable forms at relatively low cost.

Other objects and advantageous features of the invention will be apparent from the following description and the accompanying drawings, wherein, for purposes of illustration only, a specific form of the invention is set forth in detail.

In the drawings:

Figure 1 is a fragmentary and general schematic view of an irrigation ditch, partly in section and partly in elevation, showing a device in accordance with the present invention in pumping relation to the ditch, the said device being shown in vertical section taken on the line 1—1 of Figure 2;

Figure 2 is an end elevation of the device looking from right to left in Figure 1;

Figures 3 and 4 are enlarged vertical transverse sections, taken on the lines 3—3 and 4—4, respectively, of Figure 1;

Figure 5 is an enlarged side elevation of an auger impeller; and

Figure 6 is an enlarged fragmentary transverse section, taken on the line 6—6 of Figure 4.

Referring in detail to the drawings, wherein like numerals designate like parts throughout the several views, the numeral 8 generally designates an area to be drained, such as an irrigation ditch, and the numeral 10 generally designates a support at one side of and elevated above the level of the ditch 8.

The illustrated auger pump, generally designated 12, is mounted on the elevated support 10 and is operatively positioned relative to the ditch 8. The device 12 comprises a straight, uniform diameter tubular barrel 14, preferably composed of a lower section 16 and an upper section 18, secured together by bolted flanges 20. The upper end of the barrel 14 is closed by a bolted bearing head 22 having a central anti-friction bearing 24 thereon.

A platform 26 elevated above the upper end of the barrel 14 has sides disposed at opposite sides of the barrel 14, which include legs 28 secured to the upper barrel section 16 and depending therebelow and pivotally mounted, as indicated at 30 to the top of the support 10 at the ditch side thereof, whereby the pump barrel 14 is supported for tilting at different angles into and out of the ditch 8. The lower side wall 32 of the upper barrel section 18 has therein a relatively large opening 34 from which depends a conformably large cross section discharge spout 36, at a rearward declination relative to the barrel 14.

Bolted, as indicated at 38, to the lower end of the lower barrel section 16, is an annular cutter equipped water intake head 40. The head 40 comprises an upwardly tapered wall 42 having a central opening 44 across which are secured intersecting radial debris cutting blades 46 having sharpened lower cutting edges 48 facing the opening 44.

A strut or spider 50 secured across the lower end of the lower barrel section 16 at a point near to and spaced upwardly from the blades 46, carries an anti-friction bearing 52 which is axially positioned in the pump barrel 14. An axial impeller shaft 54 extends lengthwise of the barrel 14 and has a lower portion journaled through the bearing 52 and an upper portion journaled through the bearing 24. A pulley 56 fixed on the upper end of the shaft 54 is driven by a belt 58 connected to a preferably electric motor 60, mounted upon the platform 26 whereby the impeller shaft 54 is rotated in pumping direction.

Fixed on the lower end of the shaft 54 in the space between the lower bearing 52 and the cutter blades 46 and co-operating with the blades 46, is a lower auger impeller 62 which comprises a hub 64 secured on the shaft, and spiral auger blades 66 on and encircling the hub 64, each blade 66 extending only partially around the hub 64 and having leading and trailing edges 68 and 70, respectively, which are sharp debris-cutting edges. The impeller 62 is of substantially the diameter of the interior of the barrel 14 and the leading edges 68 are substantially in shearing relation to the adjacent edges of the blades 46 of the intake head 40.

An upper auger impeller 72, similar to the impeller 62, is secured on the shaft 54 at substantially the midlength point of the barrel 14.

The similar impellers 62 and 72 are each composed of a pair of the semi-circular spiral blades 66, which together constitute a mutilated or interrupted screw or helix, the interruption serving to afford the blades their cutting end edges 68 and 70.

Fixed on and extending radially inwardly from the side wall of the barrel toward the shaft 54 are elongated circumferentially spaced debris scraping blades 75, extending between the lower bearing 52 and the upper bearing 76 and supporting the intermediate bearing 24. Bearings 78 and 80 located above the upper impeller 72 and spaced downwardly from the discharge opening 34 are secured to the inward edges of scraping blades 74′ like the bearings 52. The scraping blades have beveled inner cutting edges 82 on their radially inward ends which are angled in the direction of rotation of the shaft 54 and are positioned close to the sides of the shaft 54, as shown in Figure 3.

The scraper blades 75 and 75′ are removably secured in the barrel 14 by flanges 84 on their outer edges which bear against the inside of the barrel 16 and are traversed by screws 86 traversing the barrel.

The hubs 64 of the impellers 62 and 78 have threaded sockets 88 in their opposite ends in which related ends of sections 90 and 92 of the shaft 54 are threaded, so that any desired number of shaft sections can be connected together for a desired length of pump. When the barrel sections 16 and 18 are separated, the units comprising scraper blades, bearings, and impeller shaft sections, can be slid out of the barrel sections upon removing the screws 86.

To add a section to the lower end of the lower barrel section 16 the head 40 is removed and a shaft section is screwed into the lower end of the hub of the lower impeller 62 and the additional barrel section is then bolted to the lower end of the lower barrel section 16, and the head 40 secured to the lower end of the added section.

In operation, rotation of the impeller shaft 54 by the motor 60 causes the lower impeller 62 to draw water, laden with debris, from the ditch 8, through the opening 44 of the intake head, through the blades 46 in contact with the sharp lower edges 48, whereby lumps of debris are cut into smaller pieces, the pieces are further reduced by the shearing cooperation of the sharp edges of the blades of the lower impeller 62, with the blades 46, and the water and entrained material passes around the bearing and upwardly in the barrel 14 toward the upper impeller 72 whose sharpened blade ends further cut the entrained material, and the water and entrained material passes around the upper impeller 72 toward the upper end of the barrel 14. In so doing the major part of the water and entrained matter falls into and is discharged through the opening 34. This retained material has a tendency to subside downwardly along the barrel 14 and to be then reworked and recut by the various blades above described, until sufficiently reduced in size and bulk to be recirculated upwardly and finally discharged through the opening 34.

The scraping blades 75 and 75' serve to scrape off any debris accumulating on the impeller shaft and to prevent any large and disabling accumulation of debris on the shaft.

While there has been shown and described herein a preferred form of the invention, it is to be understood that the invention is not necessarily confined thereto, and that any change or changes in the structure of and in the relative arrangement of components thereof are contemplated as being within the scope of the invention as defined by the claims appended hereto.

What is claimed is:

1. In a self-cleaning auger pump, a pump barrel having upper and lower ends, a bearing head on and closing said upper end and having an upper shaft bearing, a lower shaft bearing in said barrel adjacent to and spaced upwardly from the lower end of the barrel, strut means mounting said lower shaft bearing in concentrically spaced relation to the barrel, a water and debris intake head secured on the lower end of the barrel, said intake head having a reduced central intake opening, radial debris cutting blades on said intake head above and facing said opening, said blades having sharpened lower edges and upper edges, an impeller shaft journaled through said shaft bearings, a lower auger impeller fixed on said shaft between said lower shaft bearing and said intake head, an upper auger impeller fixed on said shaft at a point intermediate said lower impeller and the upper end of the pump barrel, said pump barrel having a lower side wall having therein a water and debris discharge opening located between and spaced from said upper impeller and the upper end of the pump barrel, and driving means mounted on the barrel at its upper end and operatively connected to the upper end of the impeller shaft.

2. In a self-cleaning auger pump, a pump barrel having upper and lower ends, a bearing head on and closing said upper end having an upper shaft bearing, a lower shaft bearing in said barrel adjacent to and spaced upwardly from the lower end of the barrel, strut means mounting said lower shaft bearing in concentrically spaced relation to the barrel, a water and debris intake head secured on the lower end of the barrel, said intake head having a reduced central intake opening, radial debris cutting blades on said intake head above and facing said opening, said blades having sharpened lower edges and upper edges, an impeller shaft journaled through said shaft bearings, a lower auger impeller fixed on said shaft between said lower shaft bearing and said intake head, an upper auger impeller fixed on said shaft at a point intermediate said lower impeller and the upper end of the pump barrel, said pump barrel having a lower side wall having therein a water and debris discharge opening located between and spaced from said upper impeller and the upper end of the pump barrel, and driving means mounted on the barrel at its upper end and operatively connected to the upper end of the impeller shaft, and radial guide blades mounted in the barrel and having free edges close to sides of the impeller shaft between the lower and upper impellers and between the upper impeller and the discharge opening.

3. In a self-cleaning auger pump, a pump barrel comprising upper and lower barrel sections, said upper barrel section having upper and lower ends, a bearing head closing the upper end of the upper barrel section, the lower end of the upper barrel section being open, an upper impeller unit removably positioned in said upper barrel section comprising longitudinally elongated circumferentially spaced radial scraper blades having inner scraping edges and outer edges, bearings spaced along and secured on the inner edges of the blades, an impeller shaft section journaled in said bearings and in said bearing head and engaged with the inner edges of the scraping blades, said impeller shaft section having an upper end to which rotating means is adapted to be operatively connected and a lower end, an impeller removably engaged on the lower end of the shaft section and positioned in the lower end of the upper barrel section, an upper part of said upper barrel section having a lateral discharge opening, and means removably securing the outer edges of the scraper blades to said upper barrel section, said lower barrel section having an upper end removably secured to the lower end of the upper barrel section and an open lower end, an impeller unit removably positioned in said lower barrel section comprising longitudinally elongated circumferentially spaced radial scraping blades having outer edges and inner scraping edges, bearings spaced along and secured to the inner edges of the scraping blades, a lower shaft section journaled through the bearings and engaged with the inner scraping edges of the blades, said lower shaft section having an upper end removably connected to the impeller of the upper unit and a lower end, a lower impeller removably secured to the lower end of the lower shaft section, said lower impeller being located in the lower end of the lower barrel section, and a blade stationary head removably secured on the lower end of the lower barrel section having stationary blade in shearing relation to the lower impeller, said lower impeller having means for removably connecting a further lower impeller shaft section thereto upon removal of said head.

References Cited in the file of this patent

UNITED STATES PATENTS

| 619,675 | Cram | Feb. 14, 1899 |
| 733,229 | Loomis | July 7, 1903 |
| 1,114,092 | Ames | Oct. 20, 1914 |
| 1,116,570 | Danner | Nov. 10, 1914 |
| 1,200,863 | Morton | Oct. 10, 1916 |
| 1,444,944 | Benson | Feb. 13, 1923 |
| 1,554,591 | Oliver | Sept. 22, 1925 |
| 1,756,276 | Bowlzer | Apr. 29, 1930 |
| 1,889,603 | Johnston | Nov. 29, 1932 |
| 2,744,465 | Springer | May 8, 1956 |

FOREIGN PATENTS

| 211,848 | Great Britain | May 29, 1924 |
| 386,626 | Great Britain | of 1933 |
| 567,472 | Great Britain | Feb. 15, 1945 |
| 899,123 | France | July 31, 1944 |